(12) United States Patent
Komatsu et al.

(10) Patent No.: US 6,940,043 B2
(45) Date of Patent: Sep. 6, 2005

(54) HEATING ELEMENT USING CHARCOAL

(75) Inventors: Toru Komatsu, Tsuru (JP); Ryusuke Nishimaki, Tsuru (JP)

(73) Assignee: Sanei Kensetsu Kabushiki Kaisha (JP)

( * ) Notice: Subject to any disclaimer, the term of this patent is extended or adjusted under 35 U.S.C. 154(b) by 0 days.

(21) Appl. No.: 10/489,538

(22) PCT Filed: Sep. 17, 2002

(86) PCT No.: PCT/JP02/09514
§ 371 (c)(1),
(2), (4) Date: Mar. 11, 2004

(87) PCT Pub. No.: WO03/026351
PCT Pub. Date: Mar. 27, 2003

(65) Prior Publication Data
US 2004/0238515 A1 Dec. 2, 2004

(30) Foreign Application Priority Data
Sep. 14, 2001 (JP) .......................... 2001-279027

(51) Int. Cl.[7] ................................. H05B 1/00
(52) U.S. Cl. .................................... 219/213
(58) Field of Search ................. 219/213, 270, 219/541, 552, 553, 333, 334

(56) References Cited

U.S. PATENT DOCUMENTS 6,018,093 A * 1/2000 Roe et al. .................. 604/367
6,790,317 B2 * 9/2004 Antal, Jr. .................... 201/35

FOREIGN PATENT DOCUMENTS

| EP | 1384558 A1 | * | 5/2002 |
| JP | S58-186191 | | 10/1983 |
| JP | 05-258842 | | 8/1993 |
| JP | 05245328 A | * | 9/1993 |
| JP | 09/190873 | | 7/1997 |
| JP | 2000-107598 | | 4/2000 |
| JP | 2000-150117 | | 5/2000 |
| JP | 2000-226207 | | 8/2000 |
| JP | 2001-176643 | | 6/2001 |

* cited by examiner

*Primary Examiner*—Robin O. Evans
*Assistant Examiner*—Vinod Patel
(74) *Attorney, Agent, or Firm*—Jeffer, Mangels, Butler & Marmaro, LLP

(57) ABSTRACT

Disclosed is a heating element which can also absorb gas, especially a heating element usable as an interior material for buildings which serves both as a heater and an absorber capable of absorbing harmful gas present in the room. This heating element comprises: a molded product comprising a high-temperature carbonized charcoal which has been carbonized at a temperature of about 800° C. or above; and at least two electrodes which can energize the molded product, wherein current is applied to the electrodes to generate heat. The molded product comprising a high-temperature carbonized charcoal, which has been carbonized at a temperature of about 800° C. or above is excellent as a heating element and, at the same time, has an excellent capacity capable of adsorbing various gases. Mixing a low-temperature carbonized charcoal, which has been carbonized at a temperature of about 500° C. or below into the molded product and, further, a combination of the molded product with alginic acid or calcium oxide can provide a heating element having excellent absorption activity.

6 Claims, 4 Drawing Sheets

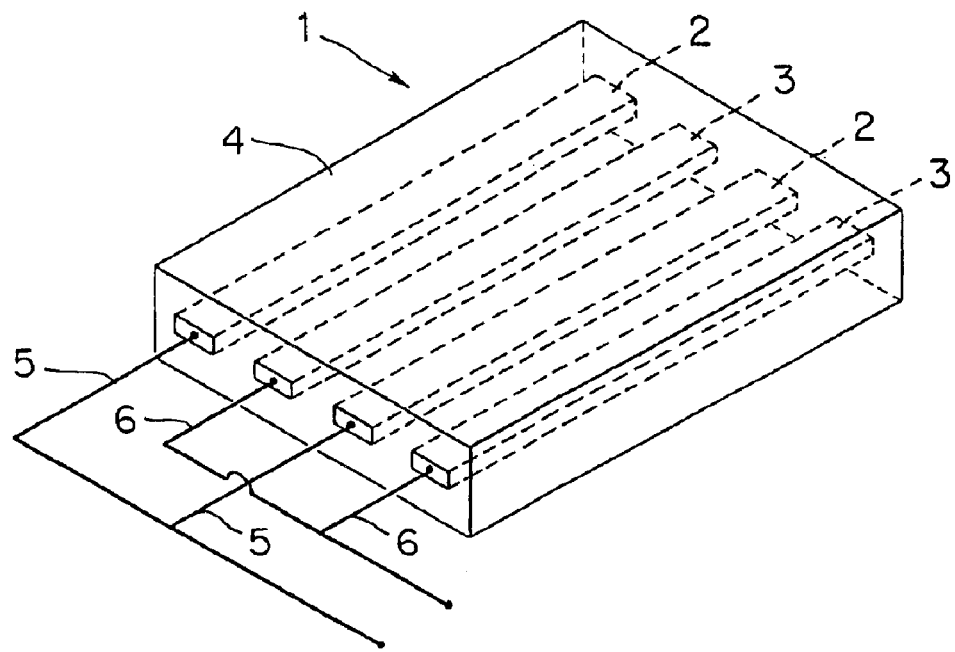
F I G. 1
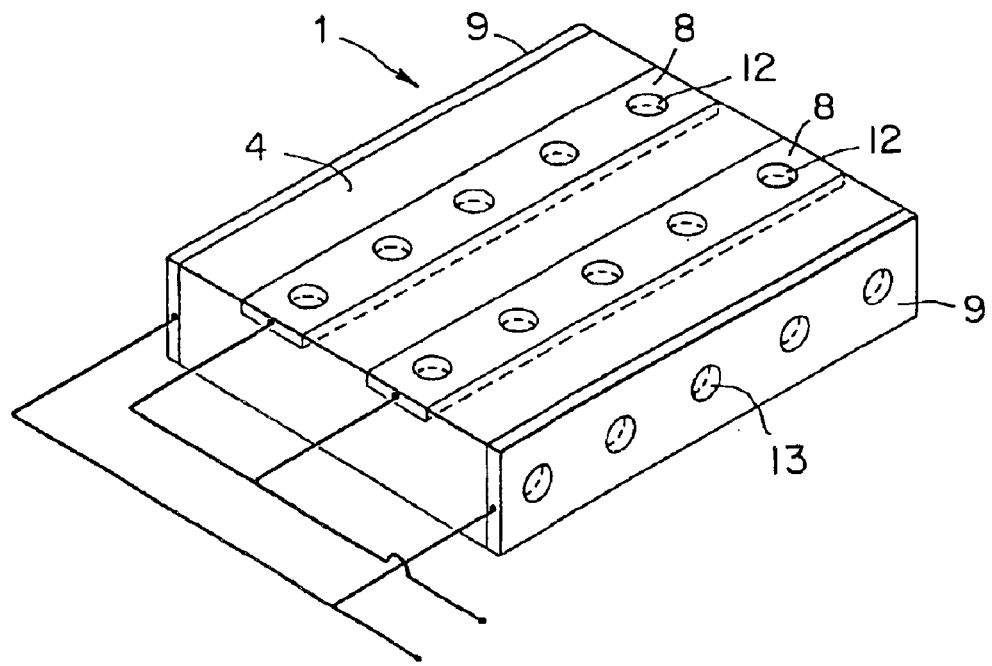
F I G. 2

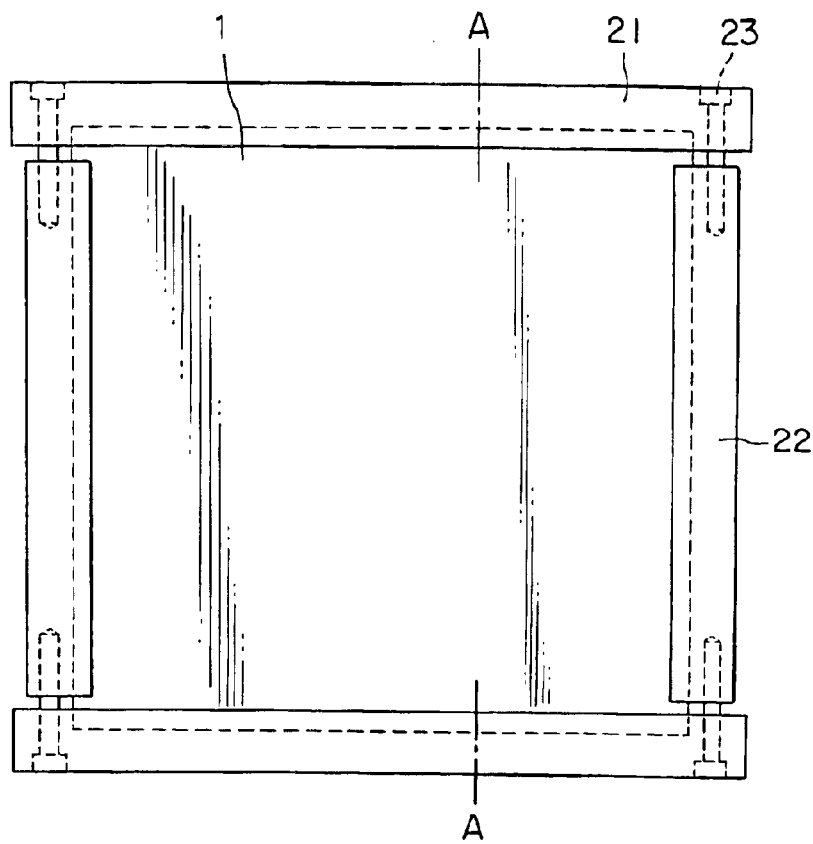
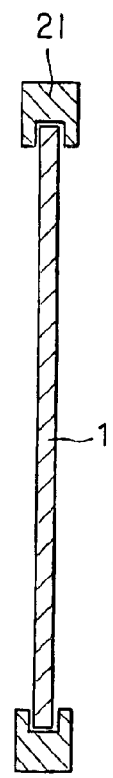
FIG. 4(a)  FIG. 4(b)
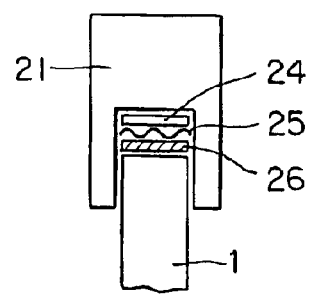
FIG. 4(c)

HEATING ELEMENT USING CHARCOAL

BACKGROUND OF THE INVENTION

1. Field of the Invention

The present invention relates to a heating element which uses heat generated upon the application of current to charcoal and, at the same time, can absorb gas.

2. Background Art

Heating elements using heat generated upon the application of current to carbon are widely known. For example, Japanese Patent Laid-Open No. 258842/1993 discloses a resistance heating element prepared by dispersing carbon fibers in Japanese paper washi to form a planar heating element. Japanese Patent Laid-Open No. 190873/1997 discloses a heating element prepared by mixing graphite powder with resin and coating the mixture onto a substrate. Japanese Patent Laid-Open No. 354257/1999 discloses a carbon heating element in a hollow form. This heating element is prepared by mixing graphite, resin, and a ceramic together, molding the mixture, treating the molded product at a temperature of 800° C. or above in an inert gas, and further baking the treated molded product in vacuo at a temperature of 1200° C.

On the other hand, a sick building syndrome or a sick house syndrome and chemical sensitivity have recently become a problem. These diseases may be caused by chemical substances released from construction materials or the like in highly airtight buildings. Studies have been made on uptake of such chemical substances present in the room by charcoal through the utilization of absorptive capacity of the charcoal to inhibit the occurrence of these symptoms.

Specifically, a proposal has hitherto been made on a technique in which a wood charcoal or a bamboo charcoal is ground to a charcoal powder and the powder is mixed with various materials to prepare a building material (for example, Japanese Patent Laid-Open Nos. 150645/1995 and 49916/1994).

Further, Japanese Patent Laid-Open No. 226207/2000 discloses a production process of an activated wood charcoal having both a low-temperature carbonized part and a high-temperature carbonized part. This production process comprises the steps of: heat-treating wood chips at 450 to 550° C. to carbonize the wood chips (a low-temperature carbonization step); and subsequently heat-treating the carbonized wood chips at 800 to 900° C. to further carbonize the wood chips (a high-temperature carbonization step). In this publication, however, there is no specific disclosure on any molded product using this activated wood charcoal. Further, this publication neither suggests nor discloses any useful binder for molding.

SUMMARY OF THE INVENTION

The present inventors have now found that a molded product containing a high-temperature carbonized charcoal, which has been carbonized at a temperature of about 800° C. or above, is excellent as a heating element and, at the same time, the molded product has an excellent capability of adsorbing various gases. The present inventors have further found mixing a low-temperature carbonized charcoal, which has been carbonized at a temperature of about 550° C. or below into the molded product and, further, a combination of the molded product with alginic acid or calcium oxide can provide a heating element having excellent absorption activity.

Accordingly, an object of the present invention is to provide a heating element which can also absorb gas, especially a heating element usable as an interior material for buildings which serves both as a heater and an absorber capable of absorbing harmful gas present in the room.

According to the present invention, there is provided a heating element comprising: a molded product comprising a high-temperature carbonized charcoal which has been carbonized at a temperature of about 800° C. or above; and at least two electrodes which can energize the molded product, wherein current is applied to the electrodes to generate heat.

BRIEF DESCRIPTION OF THE DRAWINGS

FIG. 1 is a diagram showing one embodiment of the heating element according to the present invention;

FIG. 2 is a diagram showing another embodiment of the heating element according to the present invention;

FIG. 4 is a diagram showing the heating element according to the present invention in a unit construction form, wherein FIG. 4(a) is a typical view of the whole unit, FIG. 4(b) a cross-sectional view taken on line A—A of FIG. 4(a), and FIG. 4(c) a partially enlarged view of FIG. 4(b)

DETAILED DESCRIPTION OF THE INVENTION

Fundamental Construction of Heating Element

Figure 3:
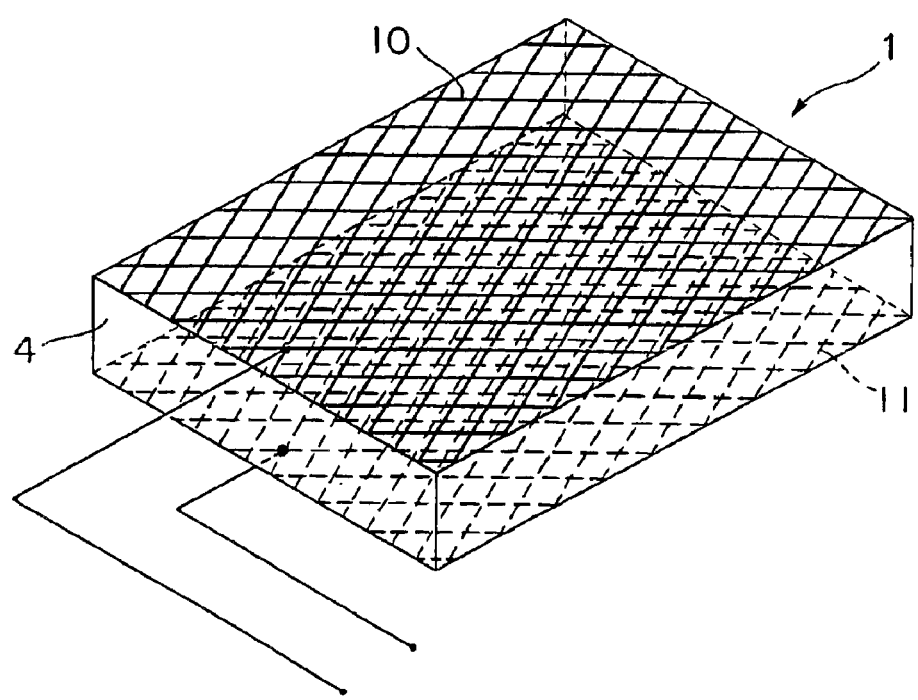
FIG. 3 is a diagram showing a further embodiment of the heating element according to the present invention.

The heating element according to the present invention comprises: a molded product comprising a high-temperature carbonized charcoal which has been carbonized at a temperature of about 800° C. or above; and at least two electrodes which can energize the molded product. Upon the application of current across the electrodes, the molded product generates heat due to electric resistance of the high-temperature carbonized charcoal and other ingredients constituting the heating element. Further, in the heating element according to the present invention, as described below, the high-temperature carbonized charcoal and, further, a low-temperature carbonized charcoal have a good gas absorptive capacity and thus can absorb harmful gases, smoke of smoking, and floating dust in the air while functioning as the heating element. The heating element according to the present invention can be utilized as heating elements in heating appliances provided with an air cleaning function and, in addition, when formed into a floor or wall material, can be utilized as a floor or wall heating material with an air cleaning function. Further, since the charcoal has a humidity conditioning function, when the charcoal is formed into indoor construction materials such as floor or wall heating materials, the development of the humidity conditioning function can also be expected.

The voltage and current applied to the heating element according to the present invention may be properly determined by taking into consideration, for example, the size of the molded product and the required temperature. Regarding the power supply, domestic power supplies (100 V to 220 V), various batteries and the like are utilizable. When the heating element is utilized as an indoor floor or wall heating material, energization is preferably carried out so that the surface temperature of the heating element is 35 to 50° C.

A construction of the heating element according to the present invention can be, for example, as shown in FIGS. 1 to 3. The heating element 1 shown in FIG. 1 has electrodes 2 and electrodes 3 which are alternately arranged and embedded in a molded product 4. The electrodes 2 and 3 may be formed of any material without particular limitation so far as the material has good electrical conductivity and does not affect the ingredients constituting the molded product 4, and examples of the material include copper, aluminum, and alloys thereof. A lead 5 and a lead 6 are connected respectively to the electrodes 2 and 3, and power supply equipment (not shown) is connected to the leads 5 and 6.

In a heating element 1 shown in FIG. 2, the electrodes 8 and 9 have through-holes 12 and 13. In this embodiment, an improvement in adhesive strength to the molded product 4 can be expected. In a heating element 1 shown in FIG. 3, electrodes 10 and 11 comprising electrically conductive fine wires provided on a net are applied to the whole area of the upper and lower surfaces of the molded product 4. In this embodiment, high energization efficiency can be expected.

In a preferred embodiment of the present invention, the heating element 1 according to the present invention is supplied as the so-called "stylized unit" which, in use, can be conveniently installed in necessary number at a necessary place. For example, as shown in FIG. 4, a panel, formed by surrounding the heating element 1 by frames 21 and 22 and fixing them with an anchor 23, may be installed as one unit. FIG. 4(a) is a typical view of the construction, and FIG. 4(b) a cross-sectional view taken on line A—A of FIG. 4(a). FIG. 4(c) is a partially enlarged view of the section of FIG. 4(b), in which a heating element 1 is fit into a frame 21. In the heating element 1, an electrode 24 is provided through a corrugated metallic sheet 25 and an electrically conductive adhesive 26. In use, a lead is connected to the electrode 24 which is then connected to a power supply. In the case of a plurality of panels, the plurality of panels may be electrically connected in parallel or in series and then connected to a power supply. The application of a decorative paper or a decorative sheet onto the surface of the heating element 1 is preferred from the viewpoint of appearance.

High-temperature Carbonized Charcoal and Low-temperature Carbonized Charcoal

In the present invention, the high-temperature carbonized charcoal refers to a charcoal produced by carbonization at a temperature of about 800° C. or above. In a preferred embodiment of the present invention, the high-temperature carbonized charcoal refers to a charcoal produced by carbonization at a temperature of about 800 to 1300° C., more preferably at a temperature of 900 to 1000° C. Activation, for example, activation by air or activation by steam, may be carried out in a refining process involved in the production of the high-temperature carbonized charcoal.

Further, in the present invention, the low-temperature carbonized charcoal refers to a charcoal produced by carbonization at a temperature of about 550° C. or below. In a preferred embodiment of the present invention, the low-temperature carbonized charcoal refers to a charcoal produced by carbonization at a temperature of about 300 to 550° C., more preferably at a temperature of 450 to 500° C.

In the present invention, wood usable as a raw material for charcoal is not particularly limited and includes conifers such as cryptomerias, Japanese cypresses (hinoki), pines, and Japanese larches, bamboos and, in addition, building waste materials.

In the present invention, the heating element may consist of a high-temperature carbonized charcoal alone. However, it should be noted that the high-temperature carbonized charcoal and the low-temperature carbonized charcoal are different from each other in absorptive capacity. Specifically, the high-temperature carbonized charcoal has high absorptive properties for formaldehyde, benzene, toluene, xylene, ethylbenzene, chlorobenzene and the like. On the other hand, the low-temperature carbonized charcoal has high absorptive properties for ammonia, amine and the like. A mixture of the high-temperature carbonized charcoal with the low-temperature carbonized charcoal has a good absorptive capacity for various materials. Accordingly, in a preferred embodiment of the present invention, the heating element according to the present invention may comprise a mixture of a high-temperature carbonized charcoal with a low-temperature carbonized charcoal.

As described above, the utilization of the mixture of the high-temperature carbonized charcoal with a low-temperature carbonized charcoal is preferred from the viewpoint of its gas absorptive capacity. In this case, further, the current resistance value of the heating element can be advantageously regulated to a proper value. The high-temperature carbonized charcoal has an electrical conductivity of not more than 10 $\Omega \cdot cm$ in terms of volume resistivity. On the other hand, the electrical conductivity of the low-temperature carbonized charcoal is generally about $10^9$ to $10^{12}$ $\Omega \cdot cm$. Mixing of these charcoals together and the regulation of the amount of a binder and the like, which will be described later, can realize the regulation of the resistance value of the heating element. The resistance value of the heating element may be properly determined by taking into consideration conditions such as desired temperature and application voltage. In general, however, the resistance value of the heating element is in the range of about 1 to 100$\Omega$, and the lower limit of the resistance value is preferably about 5$\Omega$, while the upper limit is preferably about 50$\Omega$.

The mixing ratio of the high-temperature carbonized charcoal to the low-temperature carbonized charcoal may be properly determined by taking into consideration the desired resistivity and the gas adsorptive capacity. However, the mixing ratio of the high-temperature carbonized charcoal to the low-temperature carbonized charcoal on a weight basis is preferably 100:0 to 80:20, more preferably 95:5 to 90:10.

Preferably, the high-temperature carbonized charcoal and the low-temperature carbonized charcoal are ground to prepare powder which is then used for contemplated applications. The particle diameter may be properly determined. The particle diameter, however, is preferably about 0.3 to 9.5 mm, more preferably about 0.6 to 1.18 mm.

Further, the heating element according to the present invention is also advantageous from the viewpoint of anti-static effect and electromagnetic wave shield effect.

Alginic Acid and Calcium Oxide

In the present invention, in molding the heating element, a binder may be utilized. Various binders may be utilized so far as the binders do not affect the heat generation and the gas absorptive capacity of the high-temperature carbonized charcoal and the gas absorptive capacity of the low-temperature carbonized charcoal.

In a preferred embodiment of the present invention, alginic acid or its salt or calcium oxide is used as the binder. Alginic acid or its salt, for example, sodium, potassium, or calcium salt, binds charcoal particles to one another and further has the effect of improving the gas absorptive capacity of the charcoal. When these alginic acids are used alone, as compared with the charcoal, the gas absorptive activity of the alginic acids is of course zero or, if any, is low. Therefore, it is surprising that the coexistence of the alginic acids can significantly improve the gas absorptive activity of the high-temperature carbonized charcoal and, further, the mixture of the high-temperature carbonized charcoal with the low-temperature carbonized charcoal.

In the present invention, the alginic acid or its salt refers to purified alginic acid or its salt and, in addition, materials composed mainly of alginic acid, for example, carageenan and chondrus.

Further, in the heating element according to the present invention, the amount of alginic acid or its salt added may be properly determined from the viewpoints of a function as a binder, a heating generating property, and an improvement in gas absorptive activity. The lower limit of the amount of alginic acid or its salt added, however, is preferably about 5% by weight, more preferably about 10% by weight. On the other hand, the upper limit of the amount of alginic acid or its salt added is preferably about 25% by weight, more preferably about 15% by weight.

In another embodiment of the present invention, the use of calcium oxide as the binder is preferred. As with alginic acid, this calcium oxide can improve the gas absorptive capability of the high-temperature carbonized charcoal and, further, the low-temperature carbonized charcoal. Further, the presence of calcium oxide can advantageously improve the fire resistance of the heating element. Specific examples of calcium oxide usable herein include shell baked calcium, produced by baking shell, and quick lime.

In the present invention, the amount of calcium oxide added may be properly determined from the viewpoint of improving heating generating properties and the gas absorptive activity. The lower limit of the amount of calcium oxide added is preferably about 5% by weight, and the upper limit of the amount of calcium oxide added is preferably about 15% by weight, more preferably about 7% by weight.

In still another embodiment of the present invention, the heating element comprises both alginic acid and calcium oxide. The addition of both alginic acid and calcium oxide can further improve the heat generation and gas absorptive activity of the high-temperature carbonized charcoal and, further, the low-temperature carbonized charcoal.

Furthermore, in a preferred embodiment of the present invention, the heating element further comprises, in addition to the above alginic acid and calcium oxide, other binders. Examples of such binders include diatomaceous earth, cement, polymeric binders such as isocyanate resin emulsions, and starch pastes. For example, normal portland cement, moderate-heat portland cement, high early strength portland cement, blast furnace cement, and silica cement may be utilized as the cement. The utilization of diatomaceous earth or cement is advantageous in that the fire resisting performance of the heating element can be improved. Further, when diatomaceous earth or cement is utilized, the utilization of diatomaceous earth or cement in combination with a polymeric binder as a binder is preferred. The amount of the binder added may be properly determined. When the amount of the binder added is excessively large, however, the gas absorptive activity of the heating element is sometimes deteriorated. Therefore, preferably, the amount of the binder added is carefully determined. In the present invention, the amount of the binder added is preferably about 10 to 40% by weight.

Production Process of Heating Element

The heating element according to the present invention can be easily prepared by mixing a high-temperature carbonized charcoal and optionally a low-temperature carbonized charcoal, alginic acid or calcium oxide and other binders and other ingredients together, pouring the mixture into a mold, molding the mixture, and conducting drying (at room temperature to 60° C. or below for about 3 to 5 hr).

Further, in the production of the heating element, the utilization of a filler or a reinforcement is preferred from the viewpoint of enhancing the strength. Preferred examples of fillers or reinforcements usable herein include fibrous materials, such as Manila hemps and wood pulps, wire gauzes, and lattice or honeycomb structures.

The form of the heating element according to the present invention is not particularly limited. Preferably, however, the heating element is in a board form.

Installation of the electrodes in the heating element according to the present invention is not particularly limited so far as energization can be ensured. Preferred methods, however, include, for example, physical embedding and adhesion with an electrically conductive adhesive.

EXAMPLES

Preparation of High-temperature Carbonized Charcoal and Low-Temperature Carbonized Charcoal A high-temperature carbonized charcoal and a low-temperature carbonized charcoal used in the following examples were prepared as follows. A concrete oven having an internal volume of 16 $m^3$, which has a flame port in its front, has an exhaust port in its back lower part, and has been covered in its interior with refractory bricks, was provided. Wood was placed in the oven, and initial firing was carried out from the flame port. After the elapse of about 24 hr from the initial firing, decomposition and carbonization began, and a temperature of 300 to 400° C. continued for additional about 48 hr. Thereafter, the temperature rose to 400 to 550° C. This temperature rise was judged to indicate the completion of carbonization and the initiation of a refining process. After the elapse of 5 to 10 hr from the initiation of the refining process, the oven was fully hermetically sealed and was cooled. The charcoal thus obtained was used as low-temperature carbonized charcoal. In the refining process, activation by air and activation by steam were carried out, the carbonization temperature was 900 to 1100° C., and this temperature was kept for 3 hr. The charcoal thus obtained was used as a high-temperature carbonized charcoal. The activation by air was carried out by forcibly feeding air into the oven at an air flow rate of 10 to 20 $m^3$/min until the temperature reached about 900 to 1000° C. On the other hand, the activation by steam was carried out by forcibly feeding steam at a rate of 0.5 to 2 liters/min simultaneously with the force feeding of the air.

Example 1

Figure 5:
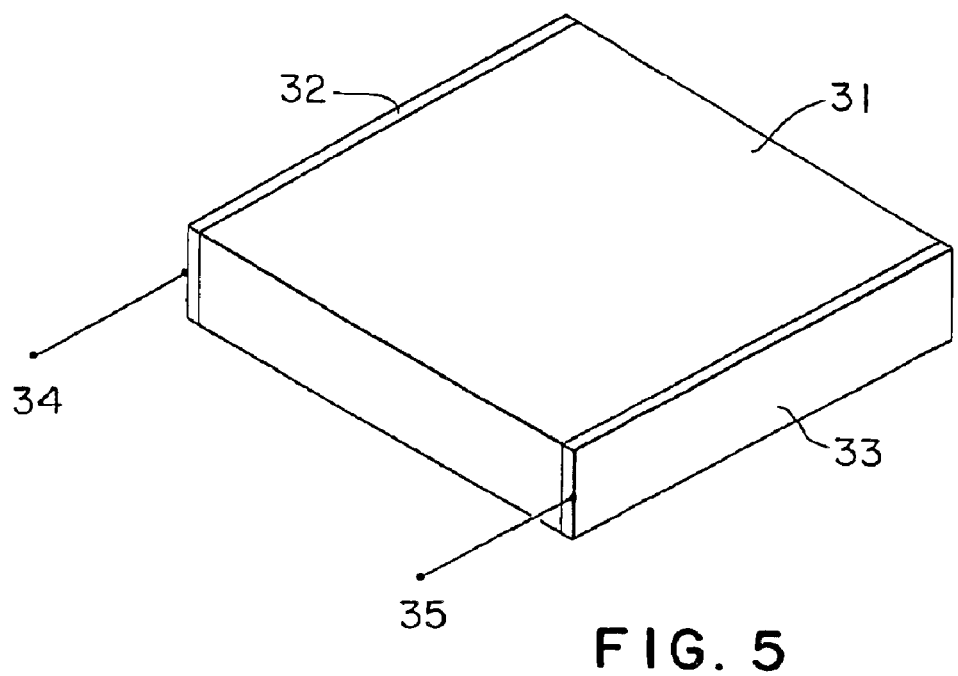
FIG. 5 is a diagram showing a heating element for which the electric resistance has been measured in Examples 1 and 2.

The high-temperature carbonized charcoal and the low-temperature carbonized charcoal were mixed together at proportions as specified in the following table. Further, 10 parts by weight of sodium alginate as a binder was added to 100 parts by weight of the high-temperature carbonized charcoal or a mixture of the high-temperature carbonized charcoal with the low-temperature carbonized charcoal, followed by molding to prepare molded products having a size of 70 mm×70 mm×15 mm. As shown in FIG. 5, copper electrodes 32 and 33 were brought into intimate contact with the molded product 31. Leads 34 and 35 were connected respectively to the electrodes, followed by the measurement of electric resistance. The results were as shown in the following table.

TABLE 1

| Test piece | High-temperature carbonized charcoal, (wt %) | Low-temperature carbonized charcoal, (wt %) | Value of resistance, (Ω) |
|---|---|---|---|
| 1 | 100 | 0 | 10 |
| 2 | 80 | 20 | 82 |
| 3 | 60 | 40 | 250 |
| 4 | 40 | 60 | 550 |
| 5 | 20 | 80 | 4700 |

For test pieces 1 and 2, AC 100 V or DC 22.5 V were applied. As a result, for both test pieces 1 and 2, the surface temperature was brought to 35 to 50° C.

Example 2

Manila hemp (50 parts by weight), 50 parts by weight of sodium alginate, and 50 parts by weight of starch were added to and mixed with 1000 parts by weight of a high-temperature carbonized charcoal. The mixture was molded to prepare a molded product having a size of 900 mm×900 mm×15 mm. The electric resistance of the molded product thus obtained was measured in the same manner as in Example 1. As a result, the electric resistance was 53Ω. AC 100 V was applied to the electrodes. As a result, the surface temperature was brought to about 50° C.

Example 3

High-temperature carbonized charcoal (70 parts by weight), 30 parts by weight of low-temperature charcoal, 5 parts by weight of alginic acid, 5 parts by weight of starch, and 5 parts by weight of Manila hemp were mixed together. The mixture was molded to prepare a molded product having a size of 10 mm×10 mm×15 mm. Electrodes were mounted on this molded product with the aid of an electrically conductive paste to prepare a heating element. This heating element was placed in a 10-liter closed test box. Power supply equipment was then connected to the electrodes, and the voltage was regulated so that the surface temperature of the heating element was brought to 45° C. Thereafter, gas was injected into the test box to a suitable concentration, and a change in gas concentration was measured over time. Gases used were formaldehyde, ammonia, and toluene.

The results were as summarized in the following table.

TABLE 3

| | | Gas concentration, ppm | |
|---|---|---|---|
| Time | Formaldehyde | Ammonia | Toluene |
| 0 | 3.25 | 24 | 42 |
| 1 | 2.10 | 23 | 30 |
| 3 | 1.49 | 19 | 22 |
| 5 | 1.16 | 17 | 17 |
| 7 | 0.92 | 15 | 10 |
| 24 | 0.54 | 9 | n.d. |
| 48 | 0.06 | 3.5 | n.d. |

In the table, n.d.: not detected.

What is claimed is:

1. A heating element comprising:

a molded product comprising: a high-temperature carbonized charcoal which has been carbonized at a temperature of at least about 800° C., a low-temperature carbonized charcoal which has been carbonized at a temperature of not more than about 550° C., and at least one selected from the group consisting of alginic acid, an alginic acid salt, and calcium oxide; and at least two electrodes which can energize the molded product when current is applied to the electrodes to generate heat.

2. The heating element according to claim 1, which contains calcium oxide and one selected from the group consisting of alginic aid and an alginic acid salt.

3. The heating element according to claim 1, wherein said high-temperature carbonized charcoal has been carbonized at a temperature of from about 800° C. to about 1300° C.

4. The heating element according to claim 1, wherein said low-temperature carbonized charcoal has been carbonized at a temperature of from about 300° C. to about 550° C.

5. The heating element according to claim 1, which is an indoor construction material.

6. The heating element according to claim 5, which is a floor material or a wall material.

* * * * *